US012422895B2

United States Patent
An et al.

(10) Patent No.: US 12,422,895 B2
(45) Date of Patent: Sep. 23, 2025

(54) FOLDABLE ELECTRONIC DEVICE COMPRISING PROTECTION MEMBER

(71) Applicant: SAMSUNG ELECTRONICS CO., LTD., Suwon-si (KR)

(72) Inventors: Jungchul An, Suwon-si (KR); Jaehwan Park, Suwon-si (KR); Seungki Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/738,358

(22) Filed: Jun. 10, 2024

(65) Prior Publication Data

US 2024/0329690 A1    Oct. 3, 2024

Related U.S. Application Data

(63) Continuation of application No. 17/428,196, filed as application No. PCT/KR2020/001820 on Feb. 10, 2020, now abandoned.

(30) Foreign Application Priority Data

Feb. 19, 2019 (KR) .................. 10-2019-0019549

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1641* (2013.01);
(Continued)

(58) Field of Classification Search
CPC .... G06F 1/1652; G06F 1/1616; G06F 1/1641; G06F 1/1656; G06F 2203/04102; H04M 1/0214; H04M 1/026; H04M 1/0268
See application file for complete search history.

(56) References Cited

U.S. PATENT DOCUMENTS

| 4,155,204 | A | 5/1979 | Prozinski |
| 9,047,044 | B2 | 6/2015 | Raff |
| 9,122,319 | B2 | 9/2015 | Kwak et al. |
| 9,173,287 | B1 * | 10/2015 | Kim ............... G06F 1/1622 |

(Continued)

FOREIGN PATENT DOCUMENTS

| CN | 1459993 | 12/2003 |
| CN | 205862269 | 1/2017 |

(Continued)

OTHER PUBLICATIONS

Hearing Notice dated Jul. 29, 2024 in Indian Patent Application No. 202117036516 and English-language translation.

(Continued)

*Primary Examiner* — Allen L Parker
*Assistant Examiner* — Martin Antonio Asmat Uceda
(74) *Attorney, Agent, or Firm* — Nixon & Vanderhye, P.C.

(57) ABSTRACT

An electronic device includes a panel which forms at least a part of a display unit and which is folded along a folding line; a bending unit arranged to be adjacent to the long side of the panel; a film unit which is connected to the bending unit and which includes a display driving circuit; an FPCB which is connected to the film unit and which connects a processor and the display driving circuit; and a protection member arranged on the bending unit so as to cover at least a part of the bending unit, wherein the protection member is adhered onto one surface of the bending unit, at which the bending unit makes contact with a bracket.

15 Claims, 14 Drawing Sheets

(52) U.S. Cl.
CPC ........ *G06F 1/1656* (2013.01); *H04M 1/0214* (2013.01); *H04M 1/026* (2013.01); *H04M 1/0268* (2013.01); *G06F 2203/04102* (2013.01)

(56) References Cited

U.S. PATENT DOCUMENTS

| | | | |
|---|---|---|---|
| 9,285,833 | B2 | 3/2016 | Raff |
| 9,513,672 | B2 | 12/2016 | Garelli et al. |
| 9,678,582 | B2 | 6/2017 | Kwak et al. |
| 9,720,447 | B2 | 8/2017 | In-Sung et al. |
| 9,736,931 | B2 | 8/2017 | Eom |
| 9,864,403 | B2 * | 1/2018 | Franklin ............ G06F 1/1626 |
| 9,866,065 | B2 | 1/2018 | Bae et al. |
| 9,886,063 | B2 * | 2/2018 | Yoo .................. G06F 3/0443 |
| 9,886,065 | B2 | 2/2018 | Raff |
| 10,019,038 | B2 | 7/2018 | Garelli et al. |
| 10,120,458 | B2 | 11/2018 | Kwak et al. |
| 10,146,259 | B1 | 12/2018 | Wu |
| 10,222,835 | B2 * | 3/2019 | Lim ................... H04M 1/0214 |
| 10,228,722 | B2 * | 3/2019 | Watamura ......... G06F 1/1616 |
| 10,274,995 | B2 | 4/2019 | Seo |
| 10,345,858 | B2 * | 7/2019 | Han .................. G06F 1/1652 |
| 10,451,908 | B2 * | 10/2019 | Jin .................... H10D 86/411 |
| 10,452,106 | B2 | 10/2019 | Cho et al. |
| 10,485,101 | B2 | 11/2019 | Eom |
| 10,561,027 | B2 | 2/2020 | Kim et al. |
| 10,568,218 | B1 * | 2/2020 | Xu .................... G02F 1/1333 |
| 10,631,408 | B2 | 4/2020 | Koo et al. |
| 10,631,437 | B2 * | 4/2020 | Fournier ............ H05K 1/0216 |
| 10,635,141 | B2 | 4/2020 | Silvanto et al. |
| 10,775,852 | B2 | 9/2020 | Kim et al. |
| 10,827,633 | B2 | 11/2020 | Yoo et al. |
| 10,856,430 | B2 | 12/2020 | Yoo et al. |
| 11,029,735 | B2 | 6/2021 | Silvanto et al. |
| 11,032,929 | B2 | 6/2021 | Yoo et al. |
| 11,061,445 | B2 | 7/2021 | Kim et al. |
| 11,096,274 | B2 | 8/2021 | Eom |
| 11,217,769 | B2 | 1/2022 | Kishimoto |
| 11,284,547 | B2 * | 3/2022 | Shin ..................... G06F 1/16 |
| 11,360,518 | B2 * | 6/2022 | Shin ................. H10K 59/131 |
| 11,576,272 | B2 | 2/2023 | Yoo et al. |
| 11,656,660 | B2 | 5/2023 | Silvanto et al. |
| 11,960,334 | B2 | 4/2024 | Silvanto et al. |
| 2003/0228884 | A1 | 12/2003 | Iwai et al. |
| 2008/0246744 | A1 | 10/2008 | Park et al. |
| 2013/0229359 | A1 * | 9/2013 | Wang .................. G06F 1/1643 345/173 |
| 2014/0320762 | A1 | 10/2014 | Jeong et al. |
| 2016/0209882 | A1 | 7/2016 | Raff |
| 2016/0327993 | A1 | 11/2016 | Garelli et al. |
| 2017/0153668 | A1 | 6/2017 | Jang et al. |
| 2018/0047938 | A1 | 2/2018 | Kishimoto |
| 2018/0059727 | A1 | 3/2018 | Seo |
| 2018/0157291 | A1 | 6/2018 | Raff |
| 2018/0199457 | A1 * | 7/2018 | Cheng ............... H10K 77/111 |
| 2018/0246592 | A1 * | 8/2018 | Savich ............... G06F 3/0443 |
| 2018/0324964 | A1 | 11/2018 | Yoo |
| 2019/0033920 | A1 | 1/2019 | Yun |
| 2019/0037694 | A1 | 1/2019 | Koo et al. |
| 2020/0110446 | A1 | 4/2020 | Raff |
| 2020/0245481 | A1 | 7/2020 | Yoon et al. |
| 2021/0255672 | A1 | 8/2021 | Kim et al. |
| 2022/0238839 | A1 | 7/2022 | Kishimoto |

FOREIGN PATENT DOCUMENTS

| | | | |
|---|---|---|---|
| CN | 107799010 | A | 3/2018 |
| CN | 108122496 | | 6/2018 |
| CN | 108508969 | | 9/2018 |
| CN | 109413230 | | 3/2019 |
| CN | 109841152 | | 6/2019 |
| CN | 111491049 | | 8/2020 |
| EP | 3 258 676 | | 12/2017 |
| KR | 10-2002-0034664 | | 5/2002 |
| KR | 10-2008-0091609 | | 10/2008 |
| KR | 10-2014-0112232 | | 9/2014 |
| KR | 10-2014-0128721 | | 11/2014 |
| KR | 10-2015-0026501 | | 3/2015 |
| KR | 10-2016-0035146 | | 3/2015 |
| KR | 20150026501 | A * | 3/2015 ............ G06F 3/041 |
| KR | 10-2015-0047356 | | 5/2015 |
| KR | 10-2016-0027625 | | 3/2016 |
| KR | 10-2018-0018972 | | 2/2018 |
| KR | 10-2018-0069763 | | 6/2018 |
| KR | 10-2018-0122210 | | 11/2018 |
| KR | 10-2019-0011994 | | 2/2019 |
| RU | 2015109723 | | 10/2016 |

OTHER PUBLICATIONS

International Search Report for PCT/KR2020/001820 dated Jun. 11, 2020, 5 pages.
Written Opinion of the ISA for PCT/KR2020/001820 dated Jun. 11, 2020, 6 pages.
Chinese Office Action issued Nov. 19, 2021 in corresponding Chinese Application No. 2020/0013321.9.
Extended Search Report and Written Opinion issued Feb. 9, 2022 in counterpart European Patent Application No. No. 20759830.1.
Notice of Allowance issued Mar. 3, 2022 in counterpart Chinese Patent Application No. 202080013321.9 and English-language translation.
Notice of Allowance and Decision to Grant issued May 20, 2022 in counterpart Russian Patent Application No. 2021124430.
Search Report issued May 19, 2022 in counterpart Russian Patent Application No. 2021124430.
Office Action dated Aug. 16, 2023 in Korean Patent Application No. 10-2023-0074815 and English-language machine translation.
Extended Search Report dated Sep. 12, 2023 in European Patent Application No. 23178393.7.
Office Action dated Dec. 21, 2023 in Korean Patent Application No. 10-2019-0019549 and English-language translation.
Notice of Allowance dated Jan. 25, 2024 in Korean Patent application No. 10-2023-0074815 and English-language machine translation.
An et al., U.S. Appl. No. 17/428,196 filed Aug. 3, 2021, allowed.
Indonesian Office Action issued Mar. 27, 2023 in corresponding Indonesian Patent Application No. P-00202106456.
Office Action dated Oct. 24, 2024 issued for the corresponding Chinese Patent Application No. 202210546828.1 and English-language translation.
Office Action dated Jan. 21, 2025 in Malaysian Patent Application No. PI2021004753.
Office Action dated Jan. 24, 2025 in Indonesian Patent Application No. P00202305700 and English-language machine translation.
Office Action dated May 26, 2025 in Chinese Application No. 202210546828.1 and English-language translation.
Office Action dated May 26, 2025 in Indian Application No. 202218037804 and English-language translation.

* cited by examiner

FOLDABLE ELECTRONIC DEVICE COMPRISING PROTECTION MEMBER

CROSS-REFERENCE TO RELATED APPLICATIONS

This application is a continuation of U.S. application Ser. No. 17/428,196, filed Aug. 3, 2021, now abandoned, which is the U.S. national phase of International Application No. PCT/KR2020/001820 filed Feb. 10, 2020, which designated the U.S. and claims priority to KR Patent Application No. 10-2019-0019549 filed Feb. 19, 2019. The entire contents of each of these applications is hereby incorporated by reference.

BACKGROUND

Field

The disclosure relates to a technology for implementing a foldable electronic device including a protective member.

Description of Related Art

In an electronic device, a display driver IC for driving a display may be disposed on a bending portion of a panel. A foldable electronic device may have a folding line across a display in a direction parallel to long sides thereof. The foldable electronic device may be folded along the folding line. In the foldable electronic device, a display driver IC may be disposed on an area adjacent to a long side that is not provided on the folding line.

SUMMARY

In the conventional electronic device, a gap is formed between the bending portion and a bracket without attachment of a separate protective member to the bending portion of the panel on which the display driver IC is disposed. A front plate of the general electronic device has rigidity, and thus the bending portion and the bracket may not make contact with each other even though pressure is applied to the front plate. However, in the case of the foldable electronic device, a front plate may have flexibility so as to be foldable. When pressure is applied to the front plate of the foldable electronic device, a bending portion and a bracket may make contact with each other. The bending portion may be damaged when foreign matter exists on a surface of the bracket in contact with the bending portion.

An aspect of the disclosure is to provide a foldable electronic device for preventing damage to a bending portion due to contact between a bracket and the bending portion.

A portable communication device according to an aspect of the disclosure comprising a housing including a first housing portion and a second housing portion and is foldable with respect to a folding axis, at least part of the housing extended toward inner part of the housing to form a supporting portion. The first housing portion includes a side wall including a first side wall extended substantially parallel to the folding axis, a second side wall extended from a first end portion of the first side wall and is substantially perpendicular to the folding axis, and a third side wall extended from a second end portion of the first side wall and is substantially perpendicular to the folding axis, and a cover member located along the first side wall, the second side wall, and the third side wall and including a first cover portion located on the first side wall and a second cover portion extended from the first cover portion and is substantially parallel to the supporting portion. A portable communication device according to an aspect of the disclosure comprising a flexible display accommodated in the housing and is spaced apart from the first side wall, the first cover portion, and the second cover portion. The flexible display includes first display portion including a plurality of pixels and visually exposed through a first side of the first housing portion and a first side of the second housing portion, a second display portion located between the first display portion and a second side of the first housing portion and is substantially parallel to the first display portion, and a bending portion adjacent to the first side wall and located between the first display portion and the second display portion. A portable communication device according to an aspect of the disclosure comprising a film member electrically connected to the flexible display and extended substantially parallel to the first display portion, wherein a first side of the film member is in contact with the second display portion, a display driver integrated circuit located on a second side of the film member and is electrically connected to the plurality of pixels, a flexible printed circuit board electrically connected to the display driver integrated circuit via the film member, a static electricity shielding member covering at least part of the second display portion, at least part of the film member, at least part of the display driver integrated circuit, and at least part of the flexible printed circuit board, and an adhesive member disposed between the supporting portion and a peripheral portion of the shielding member, wherein the peripheral portion is adjacent to the first side wall.

A portable communication device according to an aspect of the disclosure comprising a housing including a first housing portion and a second housing portion and is foldable with respect to a folding axis, at least part of the housing extended toward inner part of the housing to form a supporting portion. The first housing portion includes a side wall including a first side wall extended substantially parallel to the folding axis, a second side wall extended from a first end portion of the first side wall and is substantially perpendicular to the folding axis, and a third side wall extended from a second end portion of the first side wall and is substantially perpendicular to the folding axis, and a cover member located along the first side wall, the second side wall, and the third side wall and including a first cover portion located on the first side wall and a second cover portion extended from the first cover portion and is substantially parallel to the supporting portion. A portable communication device according to an aspect of the disclosure comprising a flexible display accommodated in the housing and is spaced apart from the first side wall, the first cover portion, and the second cover portion. The flexible display includes first display portion including a plurality of pixels and visually exposed through a first side of the first housing portion and a first side of the second housing portion, a second display portion located between the first display portion and a second side of the first housing portion and is substantially parallel to the first display portion, and a bending portion adjacent to the first side wall and located between the first display portion and the second display portion. A portable communication device according to an aspect of the disclosure comprising a film member electrically connected to the flexible display and extended substantially parallel to the first display portion, wherein a first side of the film member is in contact with the second display portion, a display driver integrated circuit located on a second side of the film member and is electrically connected to the plurality of pixels, a flexible printed circuit board electrically connected to the display driver integrated circuit via the film member, and an adhesive member disposed between the supporting portion and the second display portion, wherein the second display portion is adjacent to the first side wall.

According to the embodiments of the disclosure, the protective member may be provided on the bending portion to prevent contact between the bracket and the bending portion, thereby preventing damage to the bending portion even though pressure is applied to the front plate.

In addition, the disclosure may provide various effects that are directly or indirectly recognized.

BRIEF DESCRIPTION OF THE DRAWINGS

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
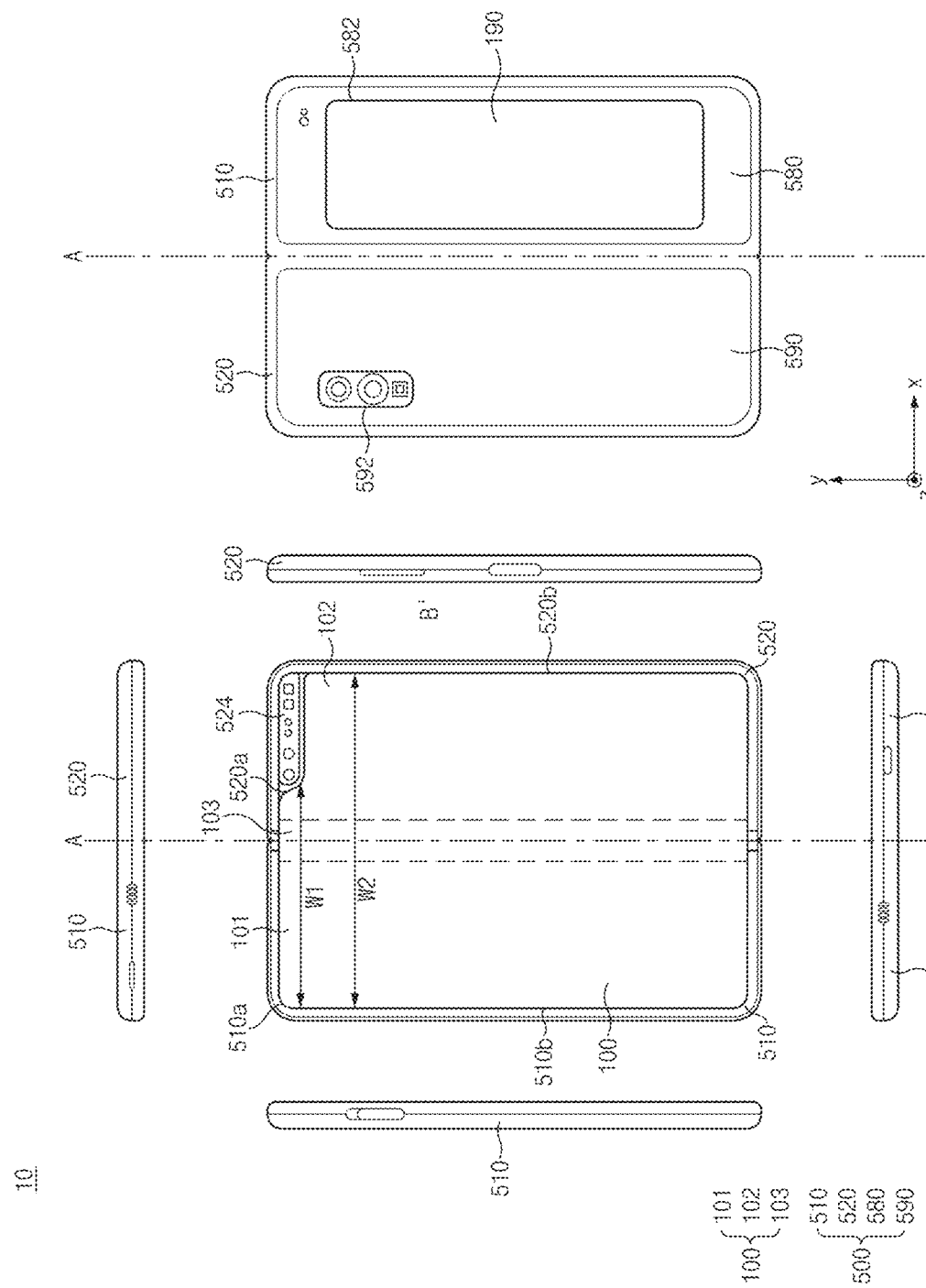
FIG. 1 is a view illustrating a flat state of an electronic device according to an embodiment.
Figure 2:
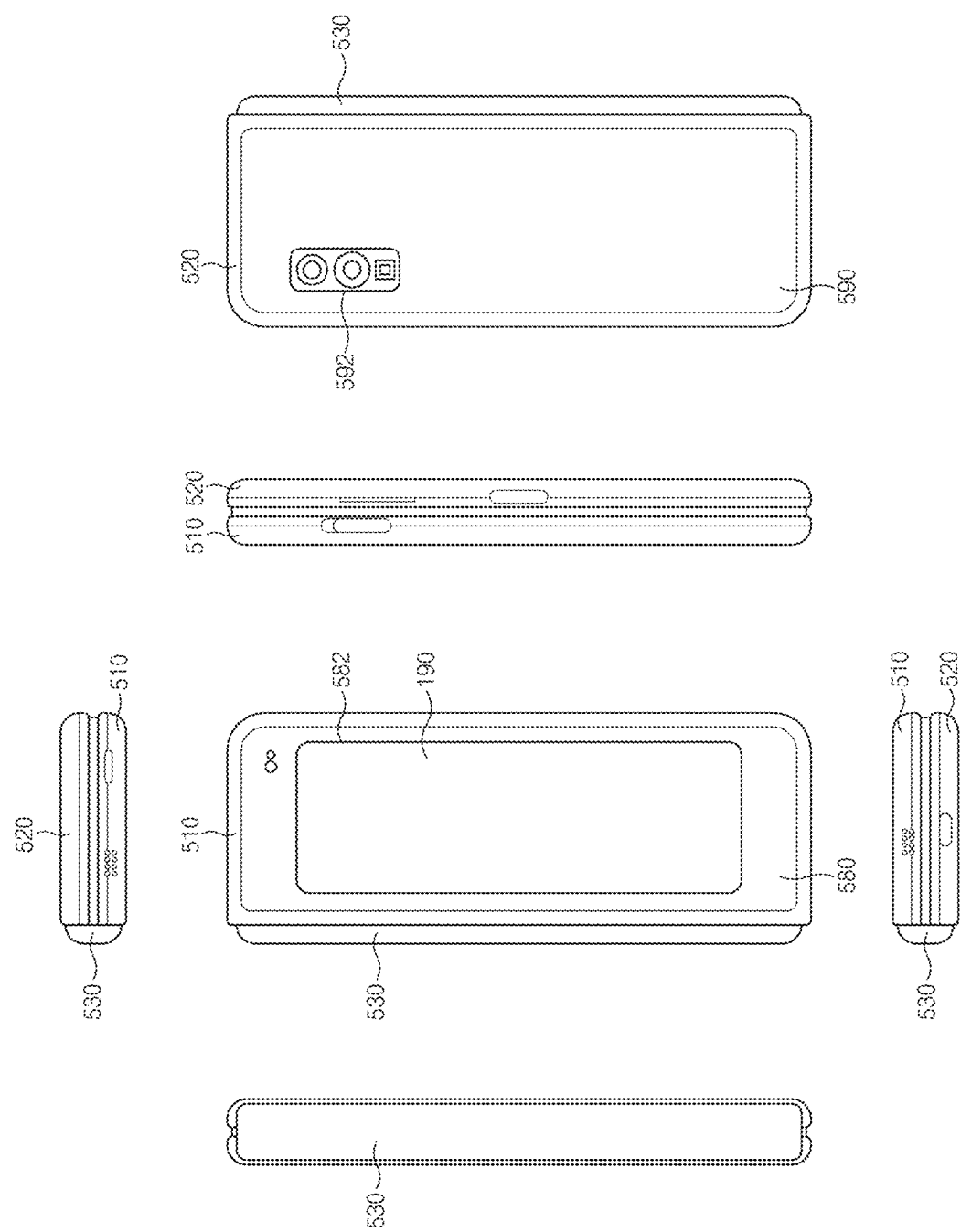
FIG. 2 is a view illustrating a folded state of the electronic device according to an embodiment.

FIG. 1 is a view illustrating a flat state of an electronic device according to an embodiment. FIG. 2 is a view illustrating a folded state of the electronic device according to an embodiment.

Referring to FIGS. 1 and 2, in an embodiment, the electronic device 10 may include a foldable housing 500, a hinge cover 530 that covers a foldable portion of the foldable housing, and a flexible or foldable display 100 (hereinafter, abbreviated to the "display" 100) that is disposed in a space formed by the foldable housing 500. In this disclosure, a side on which the display 100 is disposed is defined as a first side or a front side of the electronic device 10. A side facing away from the front side is defined as a second side or a rear side of the electronic device 10. Furthermore, sides surrounding a space between the front side and the rear side are defined as third sides or lateral sides of the electronic device 10.

In an embodiment, the foldable housing 500 may include a first housing structure 510, a second housing structure 520 including a sensor area 524, a first back cover 580, and a second back cover 590. The foldable housing 500 of the electronic device 10 is not limited to the form and coupling illustrated in FIGS. 1 and 2 and may be implemented by a combination and/or coupling of other shapes or components. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis (an axis A) and may have shapes substantially symmetric to each other with respect to the folding axis A. As will be described below, the angle or distance between the first housing structure 510 and the second housing structure 520 may vary depending on whether the electronic device 10 is in a flat state, a folded state, or an intermediate state. In the illustrated embodiment, unlike the first housing structure 510, the second housing structure 520 may additionally include the sensor area 524 in which various sensors are disposed. However, the first housing structure 510 and the second housing structure 520 may have mutually symmetrical shapes in the other areas.

In an embodiment, as illustrated in FIG. 1, the first housing structure 510 and the second housing structure 520 may form a recess in which the display 100 is accommodated. In the illustrated embodiment, due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed at the periphery of the sensor area 524 and (2) a second width w2 between a second portion 510b of the first housing structure 510 and a second portion 520b of the second housing structure 520 that does not correspond to the sensor area 524 and that is parallel to the folding axis A. In this case, the second width w2 may be greater than the first width w1. In other words, the first portion 510a of the first housing structure 510 and the first portion 520a of the second housing structure 520 that have mutually asymmetrical shapes may form the first width w1 of the recess, and the second portion 510b of the first housing structure 510 and the second portion 520b of the second housing structure 520 that have mutually symmetrical shapes may form the second width w2 of the recess. In an embodiment, the first portion 520a and the second portion 520b of the second housing structure 520 may have different distances from the folding axis A. The width of the recess is not limited to the illustrated example. In various embodiments, the recess may have a plurality of widths depending on the form of the sensor area 524 or the asymmetrical portions of the first housing structure 510 and the second housing structure 520.

In an embodiment, at least part of the first housing structure 510 and at least part of the second housing structure 520 may be formed of a metallic or non-metallic material having a rigidity selected to support the display 100.

In an embodiment, the sensor area 524 may have a predetermined area adjacent to one corner of the second housing structure 520. However, the arrangement, shape, and size of the sensor area 524 are not limited to the illustrated example. For example, in another embodiment, the sensor area 524 may be provided in another corner of the second housing structure 520 or in any area between an upper corner and a lower corner of the second housing structure 520. In an embodiment, components embedded in the electronic device 10 for performing various functions may be exposed on the front side of the electronic device 10 through the sensor area 524 or through one or more openings formed in the sensor area 524. In various embodiments, the components may include various types of sensors. The sensors may include, for example, at least one of a front camera, a receiver, or a proximity sensor.

The first back cover 580 may be disposed on one side of the folding axis on the rear side of the electronic device. For example, the first back cover 580 may have a substantially rectangular periphery, and the periphery may be surrounded by the first housing structure 510. Similarly, the second back cover 590 may be disposed on an opposite side of the folding axis on the rear side of the electronic device, and the periphery of the second back cover 590 may be surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have to have mutually symmetrical shapes. In another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various components (e.g., a printed circuit board or a battery) of the electronic device 10 are disposed. In an embodiment, one or more components may be disposed, or visually exposed, on the rear side of the electronic device 10. For example, at least part of a sub-display 190 may be visually exposed through a first rear area 582 of the first back cover 580. In another embodiment, one or more components or sensors may be visually exposed through a second rear area 592 of the second back cover 590. In various embodiments, the sensors may include a proximity sensor and/or a rear camera.

Referring to FIG. 2, the hinge cover 530 may be disposed between the first housing structure 510 and the second housing structure 520 and may be configured to hide an internal component (e.g., a hinge structure). In an embodiment, the hinge cover 530 may be hidden by part of the first housing structure 510 and part of the second housing structure 520, or may be exposed to the outside, depending on a state (a flat state or a folded state) of the electronic device 10.

For example, when the electronic device 10 is in a flat state as illustrated in FIG. 1, the hinge cover 530 may not be exposed by being hidden by the first housing structure 510 and the second housing structure 520. In another example, when the electronic device 10 is in a folded state (e.g., a fully folded state) as illustrated in FIG. 2, the hinge cover 530 may be exposed to the outside from between the first housing structure 510 and the second housing structure 520. In another example, when the electronic device 10 is in an intermediate state in which the first housing structure 510 and the second housing structure 520 are folded with a certain angle, part of the hinge cover 530 may be exposed to the outside from between the first housing structure 510 and the second housing structure 520. However, in this case, the exposed area may be smaller than that when the electronic device 10 is in the fully folded state. In an embodiment, the hinge cover 530 may include a curved surface.

The display 100 may be disposed in the space formed by the foldable housing 500. For example, the display 100 may be mounted in the recess formed by the foldable housing 500 and may form most of the front side of the electronic device 10.

Accordingly, the front side of the electronic device 10 may include the display 100, and a partial area of the first housing structure 510 and a partial area of the second housing structure 520 that are adjacent to the display 100. The rear side of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 100 may refer to a display, at least a partial area of which is able to be deformed to be flat or curved. In an embodiment, the display 100 may include a folding area 103, a first area 101 disposed on one side of the folding area 103 (on a left side of the folding area 103 illustrated in FIG. 1), and a second area 102 disposed on an opposite side of the folding area 103 (on a right side of the folding area 113 illustrated in FIG. 1).

The division of the display 100 into the areas illustrated in FIG. 1 is illustrative, and the display 100 may be divided into a plurality of areas (e.g., four or more areas, or two areas) depending on the structure or function of the display 100. For example, in the embodiment illustrated in FIG. 1, the areas of the display 100 may be divided from each other by the folding area 103 or the folding axis (the axis A) that extends parallel to the y-axis. However, in another embodiment, the display 100 may be divided into areas with respect to another folding area (e.g., a folding area parallel to the x-axis) or another folding axis (e.g., a folding axis parallel to the x-axis).

The first area 101 and the second area 102 may have shapes substantially symmetric to each other with respect to the folding area 103. However, unlike the first area 101, the second area 102 may include a notch that is cut depending on the presence of the sensor area 524, and in the other area, the second area 102 may have a shape symmetric to the shape of the first area 101. In other words, the first area 101 and the second area 102 may include portions having mutually symmetrical shapes and portions having mutually asymmetrical shapes.

Hereinafter, operations of the first housing structure 510 and the second housing structure 520 and the areas of the display 100 depending on a state (e.g., a flat state or a folded state) of the electronic device 10 will be described.

In an embodiment, when the electronic device 10 is in a flat state (e.g., FIG. 1), the first housing structure 510 and the second housing structure 520 may face the same direction while forming an angle of 180 degrees therebetween. A surface of the first area 101 and a surface of the second area 102 of the display 100 may face the same direction (e.g., the direction toward the front side of the electronic device) while forming an angle of 180 degrees. The folding area 103 may form the same plane as the first area 101 and the second area 102.

In an embodiment, when the electronic device 10 is in a folded state (e.g., FIG. 2), the first housing structure 510 and the second housing structure 520 may face each other. The surface of the first area 101 and the surface of the second area 102 of the display 100 may face each other while forming a narrow angle (e.g., an angle between 0 degrees and 10 degrees). At least part of the folding area 103 may be curved to have a predetermined curvature.

In an embodiment, when the electronic device 10 is in an intermediate state (e.g., FIG. 2), the first housing structure 510 and the second housing structure 520 may form a certain angle therebetween. The surface of the first area 101 and the surface of the second area 102 of the display 100 may form an angle greater than that in the folded state and smaller than that in the flat state. At least part of the folding area 103 may be curved to have a predetermined curvature, and the curvature may be smaller than that in the folded state.

Figure 3:
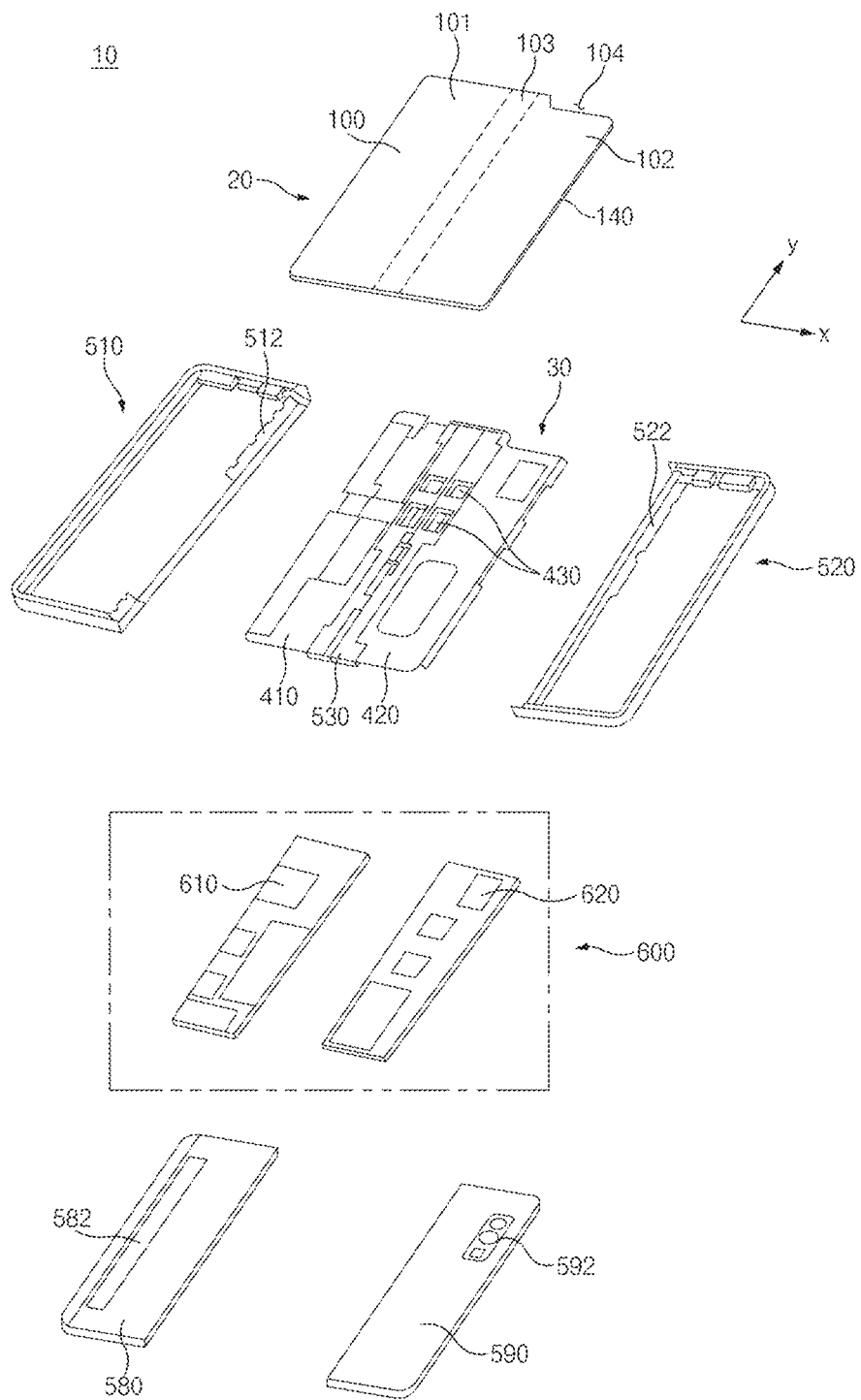
FIG. 3 is an exploded perspective view of the electronic device according to an embodiment.

FIG. 3 is an exploded perspective view of the electronic device according to an embodiment.

Referring to FIG. 3, in an embodiment, the electronic device 10 may include a display unit 20, a bracket assembly 30, a circuit board 600, the first housing structure 510, the second housing structure 520, the first back cover 580, and the second back cover 590. In this disclosure, the display unit 20 may be referred to as the display module or the display assembly.

The display unit 20 may include the display 100 and one or more plates or layers 140 on which the display 100 is mounted. In an embodiment, the plates 140 may be disposed between the display 100 and the bracket assembly 30. The display 100 may be disposed on at least part of one surface (e.g., an upper surface with respect to FIG. 3) of the plates 140. The plates 140 may be formed in a shape corresponding to the display 100. For example, partial areas of the plates 140 may be formed in a shape corresponding to a notch 104 of the display 100.

The bracket assembly 30 may include a first bracket 410, a second bracket 420, a hinge structure disposed between the first bracket 410 and the second bracket 420, the hinge cover 530 that covers the hinge structure when viewed from the outside, and wiring members 430 (e.g., flexible printed circuits (FPCs)) across the first bracket 410 and the second bracket 420.

In an embodiment, the bracket assembly 30 may be disposed between the plates 140 and the circuit board 600. For example, the first bracket 410 may be disposed between the first area 101 of the display 100 and a first circuit board 610. The second bracket 420 may be disposed between the second area 102 of the display 100 and a second circuit board 620.

In an embodiment, at least parts of the wiring members 430 and at least part of the hinge structure 300 may be disposed inside the bracket assembly 30. The wiring members 430 may be disposed in a direction (e.g., the x-axis direction) across the first bracket 410 and the second bracket 420. The wiring members 430 may be disposed in a direction (e.g., the x-axis direction) perpendicular to a folding axis (e.g., the y-axis or the folding axis A of FIG. 1) of the folding area 103 of the electronic device 10.

The circuit board 600, as mentioned above, may include the first circuit board 610 disposed on one side of the first bracket 410 and the second circuit board 620 disposed on one side of the second bracket 420. The first circuit board 610 and the second circuit board 620 may be disposed in a space formed by the bracket assembly 30, the first housing structure 510, the second housing structure 520, the first back cover 580, and the second back cover 590. Components for implementing various functions of the electronic device 10 may be mounted on the first circuit board 610 and the second circuit board 620.

The first housing structure 510 and the second housing structure 520 may be assembled together so as to be coupled to opposite sides of the bracket assembly 30 in the state in which the display unit 20 is coupled to the bracket assembly 30. As will be described below, the first housing structure 510 and the second housing structure 520 may be coupled with the bracket assembly 30 by sliding on the opposite sides of the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

In an embodiment, when the electronic device 10 is in a flat state (e.g., the electronic device of FIG. 1), the first rotation support surface 512 and the second rotation support surface 522 may cover the hinge cover 530, and the hinge cover 530 may not be exposed, or may be minimally exposed, on the rear side of the electronic device 10. Meanwhile, when the electronic device 10 is in a folded state (e.g., the electronic device of FIG. 2), the first rotation support surface 512 and the second rotation support surface 522 may rotate along the curved surface included in the hinge cover 530, and the hinge cover 530 may be exposed on the rear side of the electronic device 10 to the maximum.

Figure 4:
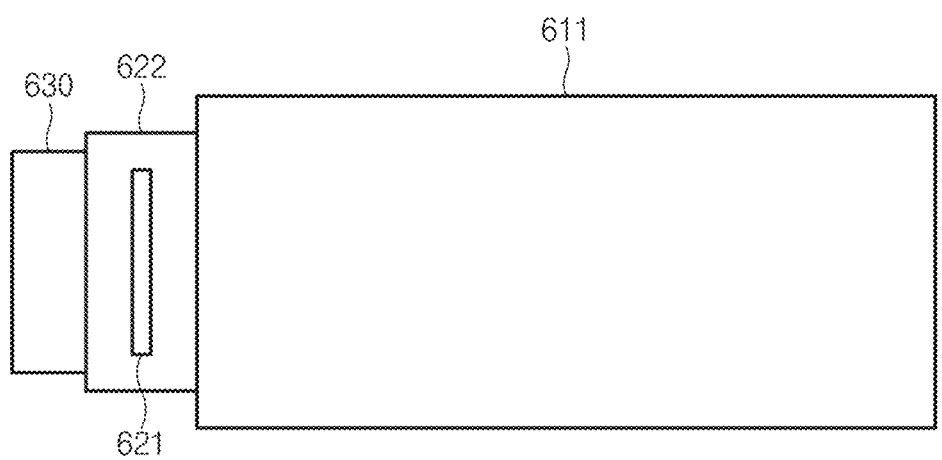
FIG. 4 is a view illustrating a panel, a bending portion, a display driver IC, and a film portion of a conventional electronic device.

FIG. 4 is a view illustrating a panel 611, a bending portion 622, a display driver IC 621, and a film portion 630 of a conventional electronic device. It is exemplified that the conventional electronic device illustrated in FIG. 4 is not a foldable electronic device.

Figure 12:
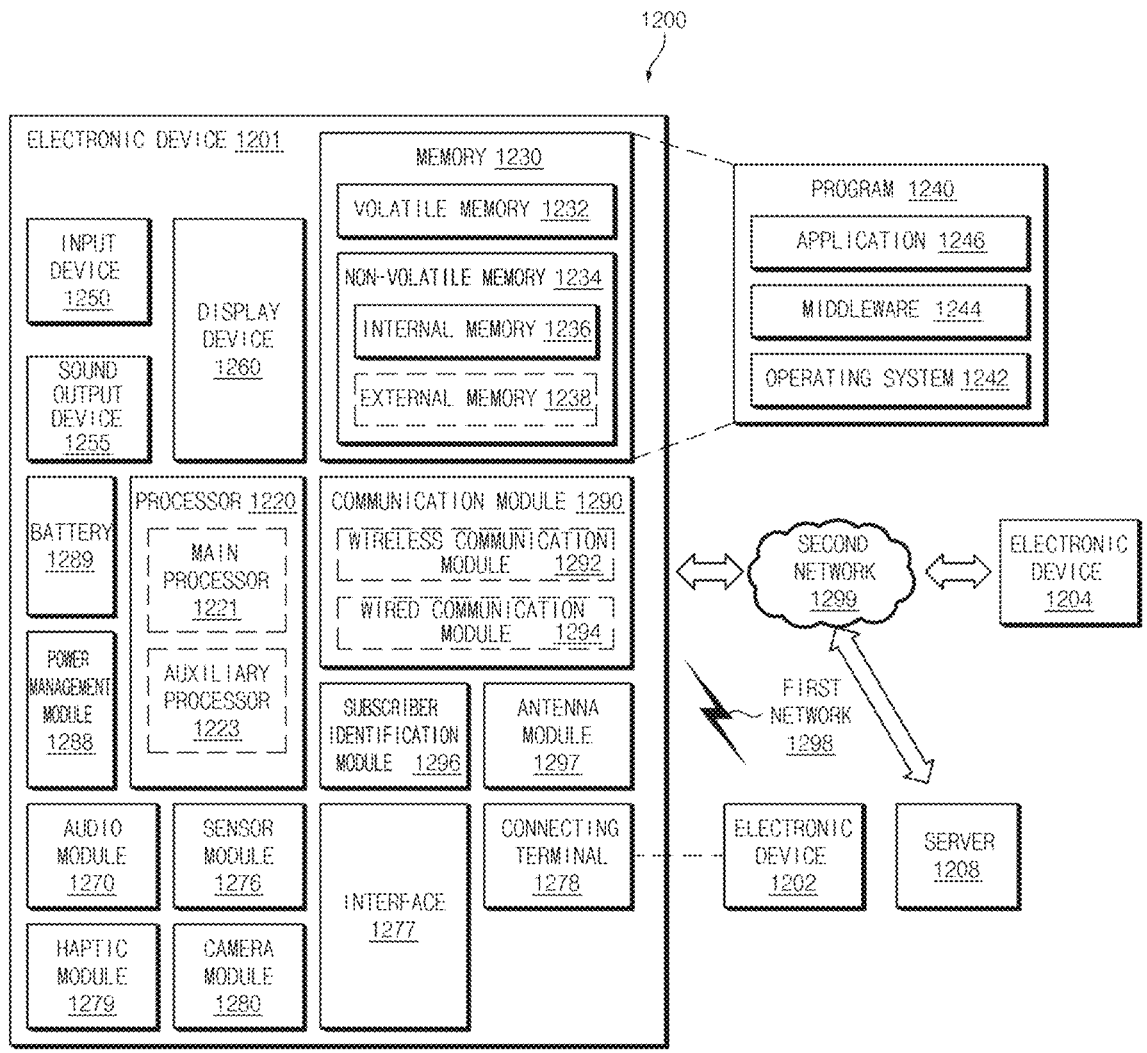
FIG. 12 is a block diagram illustrating an electronic device in a network environment according to various embodiments.

The panel 611 may form at least part of a display device (e.g., a display device 1260 of FIG. 12). The panel 611 may display a screen. The bending portion 622 may be folded to face toward a rear side of the panel 611. The bending portion 622 may extend from one side of the panel 611. The display driver IC 621 for driving the panel 611 may be mounted on the bending portion 622. FIG. 4 illustrates a state in which the bending portion 622 is unfolded before the panel 611 is mounted in the electronic device. The film portion 630 may be connected with the bending portion 622 and may face one surface of the panel 611. Elements for driving a display (e.g., the display 100 of FIG. 1) of the panel 611 and a touch panel may be mounted on the film portion 630.

In the conventional electronic device, the bending portion 622 may be disposed adjacent to a short side of the panel 611.

Figure 5A:
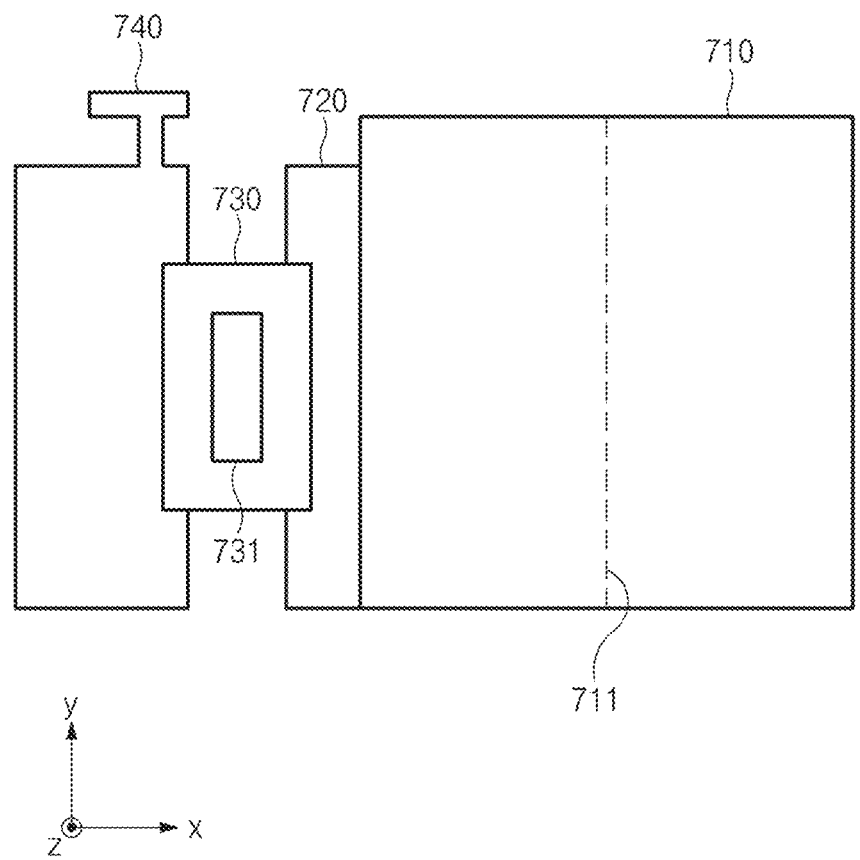
FIG. 5A is a view illustrating a panel, a bending portion, a film portion, a display driver IC, and an FPCB of a conventional electronic device.

FIG. 5A is a view illustrating a panel 710, a bending portion 720, a film portion 730, a display driver IC 731, and an FPCB 740 of a conventional electronic device. It is exemplified that the conventional electronic device illustrated in FIG. 5A is a foldable electronic device. FIG. 5A illustrates a state in which the bending portion 720 is unfolded before the panel 710 is mounted in the electronic device.

The panel 710 may form at least part of a display unit (e.g., the display unit 20 of FIG. 3). The panel 710 may be folded along a folding line 711. The bending portion 720 may be disposed adjacent to a side of the panel 710 that is parallel to the folding line 711. The film portion 730 may be connected with the bending portion 720. The film portion 730 may include the display driver IC 731. The FPCB 740 may be connected with the film portion 730. The FPCB 740 may connect a processor (e.g., a processor 1220 of FIG. 12) and the display driver IC 731.

In the conventional foldable electronic device, the display driver IC 731 may be disposed adjacent to the side of the panel 710 that is parallel to the folding line 711. For example, the display driver IC 730 may be disposed adjacent to a side formed in the Y-axis direction that is the direction of the folding line 711. The display driver IC 731 may be disposed parallel to the folding line 711 of the panel 710. In particular, when the folding line 711 is formed in the Y-axis direction parallel to long sides of the panel 710, the display driver IC 731 may be disposed parallel to the long sides of the panel 710, and thus the number of data lines connecting the display driver IC 731 and pixels of the panel 710 may increase. The number of output ports of the display driver IC 731 may be specified. To decrease the number of data lines, a multiplexer (MUX) (e.g., a 2:1 MUX or a 3:1 MUX) may be used in the display driver IC 731. When the multiplexer is used, switching of data lines may be required within one frame (1H) duration (scan timing). A structure in which a load such as impedance between the display driver IC 731 and the panel 710 is decreased may be required to ensure timing required for the switching. Due to physical characteristics, the bending portion 720, the film portion 730, and the display driver IC 731 may have smaller load impedance when implemented in a chip on film (COF) structure than when implemented in a chip on plastic (COP) structure. Accordingly, the display driver IC 731 may need to be disposed on the film portion 730 in a COF structure.

Furthermore, in the conventional foldable electronic device, the bending portion 720 may be disposed adjacent to a long side of the panel 710, and thus the length of the bending portion 720 may increase. When the length of the bending portion 720 increases, the area of the bending portion 720 may also increase. With the increase in the area of the bending portion 720, the area where the bending portion 720 makes contact with a bracket (e.g., the bracket assembly 30 of FIG. 3) of the electronic device may increase, when the bending portion 720 is mounted in the electronic device in a state of being folded to face toward a rear side of the panel 611. When the bending portion 720 makes contact with the bracket 30, the bending portion 720 may be damaged by foreign matter on the bracket 30.

Figure 5B:
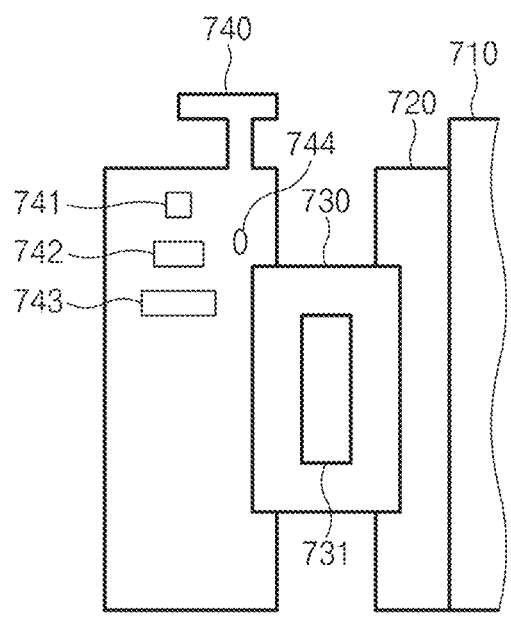
FIG. 5B is a view illustrating a bending portion, a film portion, and an FPCB of an electronic device according to an embodiment.

FIG. 5B is a view illustrating a bending portion 720, a film portion 730, and an FPCB 740 of an electronic device according to an embodiment.

In an embodiment, the FPCB 740 may include a memory 741, a touch IC 742, power distribution circuitry 743, and a static-electricity emitting element 744. The memory 741 may store data to be transferred to a display driver IC 731. The memory 741 may be implemented with a non-volatile memory such as a flash memory. The touch IC 742 may receive and process a touch input to a panel (e.g., the panel 710 of FIG. 5A) and may transfer touch input information to a processor (e.g., the processor 1220 of FIG. 12). The power distribution circuitry 743 may distribute a signal and/or data transferred from the memory 741 and/or the touch IC 742 to pixels on the panel 710, or may perform decap on the signal and/or the data and then transfer the signal and/or the data subjected to the decap to the pixels on the panel 710. The static-electricity emitting element 744 may emit static electricity generated from or introduced into the FPCB 740. For example, the static-electricity emitting element 744 may be implemented with an ESD diode.

Figure 6:
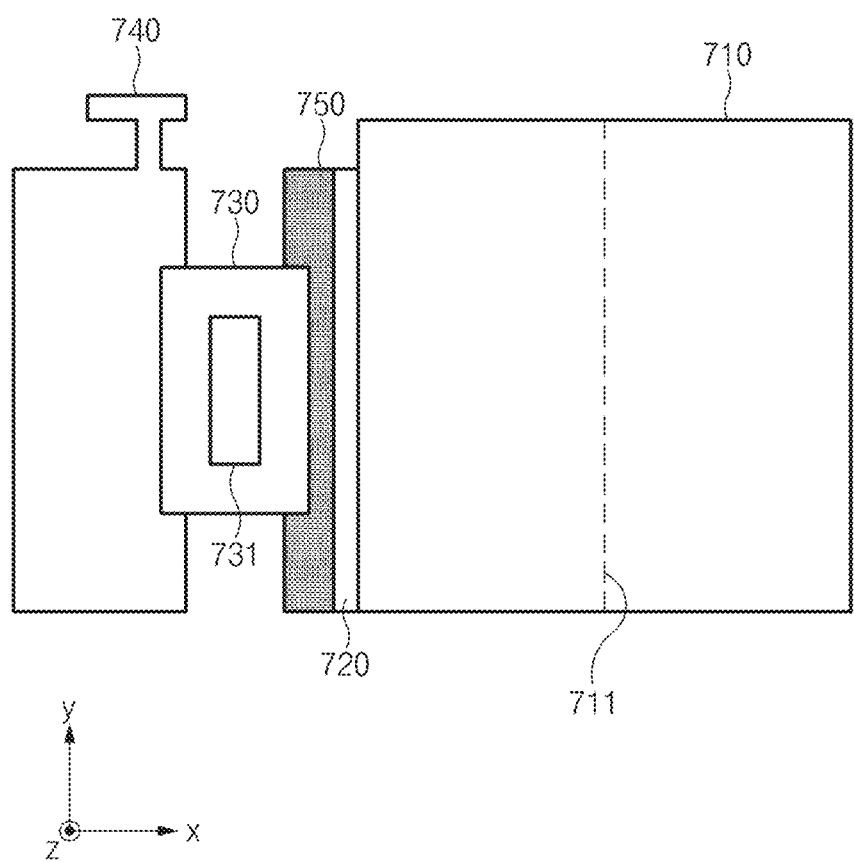
FIG. 6 is a view illustrating a panel, a bending portion, a film portion, a display driver IC, an FPCB, and a protective member of an electronic device according to an embodiment.

FIG. 6 is a view illustrating a panel 710, a bending portion 720, a film portion 730, a display driver IC 731, an FPCB 740, and a protective member 750 of an electronic device according to an embodiment.

In an embodiment, the protective member 750 may be disposed on the bending portion 720. The protective member 750 may cover at least part of the bending portion 720. The protective member 750 may be attached to one surface in contact with a bracket (e.g., the bracket assembly 30 of FIG. 3) of the electronic device. Opposite surfaces of the protective member 750 may be attached to one surface of the bending portion 720 and one surface of the bracket 30, respectively.

In an embodiment, the protective member 750 may protect the bending portion 720. The exposed area of the bending portion 720 of the electronic device according to the embodiment may be relatively large, compared to those of the bending portions of the conventional electronic devices. Accordingly, the area where the bending portion 720 is likely to make contact with the bracket 30 may increase.

Furthermore, when the electronic device according to the embodiment is a foldable electronic device, due to the nature of a flexible display (e.g., the display 100 of FIG. 1) used in the foldable electronic device, a phenomenon in which the flexible display is pressed when pressure is applied to an upper portion thereof may arise. To protect a surface of the display 100, an end portion of the display 100 may not be attached to a housing (e.g., the foldable housing 500 of FIG. 1). Accordingly, a necessity to protect the display 100 from the rear may increase.

In an embodiment, the protective member 750 may prevent contact between the bending portion 720 and the bracket 30. The protective member 750 may prevent accumulation of foreign matter on the bracket 30. The protective member 750 may include an adhesive member for attaching the bending portion 720 and the bracket 30. For example, the protective member 750 may include a pressure sensitive adhesive (PSA).

In an embodiment, the panel 710 of the electronic device may have flexibility so as to be folded along a folding line 711. When pressure is applied to the panel 710, pressure may be applied to the bending portion 720 and the bracket 30. The protective member 750 may be disposed between the bending portion 720 and the bracket 30 and may absorb the pressure applied to the bending portion 720 and the bracket 30.

Figure 7:
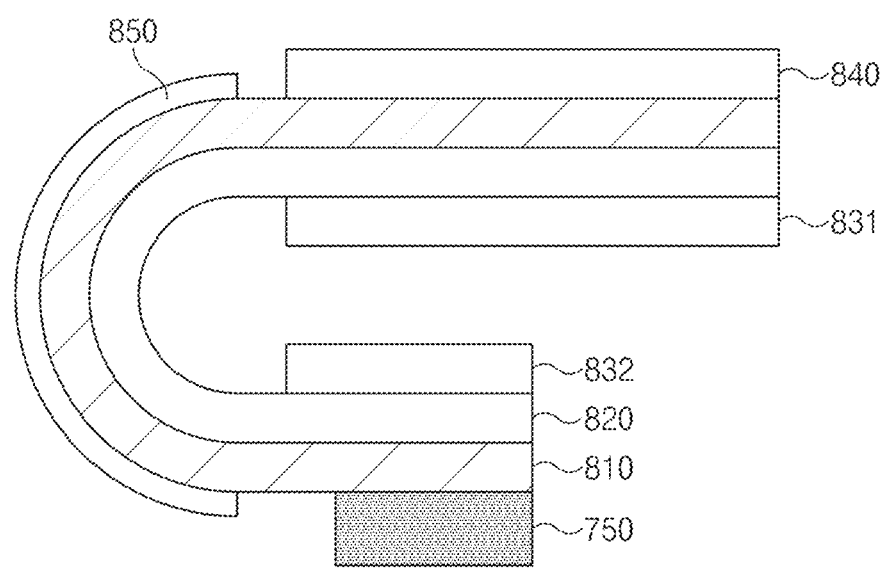
FIG. 7 is a view illustrating a transistor layer, a substrate layer, a plurality of films, an encapsulation layer, and a resin layer included in a panel and a bending portion, and a protective member of an electronic device according to an embodiment.

FIG. 7 is a view illustrating a transistor layer 810, a substrate layer 820, a plurality of films 831 and 832, an encapsulation layer 840, and a resin layer 850 included in a panel (e.g., the panel 710 of FIG. 6) and a bending portion (e.g., the bending portion 720 of FIG. 6), and a protective member 750 of an electronic device according to an embodiment.

In an embodiment, the transistor layer 810 may drive pixels included in the panel 710. The transistor layer 810 may include a light-emitting element layer including the pixels. For example, the transistor layer 810 may include an organic light emitting diode (OLED) layer. The transistor layer 810 may include thin film transistors (TFTs). The transistor layer 810 may include wires for driving the panel 710, the wires being connected with a touch screen panel (TSP) and the pixels provided in the panel 710.

In an embodiment, the substrate layer 820 may be disposed on one surface of the transistor layer 810. For example, the substrate layer 820 may be disposed on an inside surface when the transistor layer 810 is bent. The substrate layer 820 may support the transistor layer 810. The substrate layer 820 may form a lower substrate of the panel 710. The substrate layer 820 may cause the panel 710 to have flexibility. The substrate layer 820 may contain a material having flexibility. For example, the substrate layer 820 may contain polyimide (PI).

In an embodiment, the plurality of films 831 and 832 may include the first film 831 and the second film 832. The first film 831 and the second film 832 may be disposed on one surface of the substrate layer 820. For example, the first film 831 may be disposed on one surface of the substrate layer 820 included in the panel 710, and the second film 832 may be disposed on one surface of the substrate layer 820 included in the bending portion 720. The first film 831 and the second film 832 may be disposed on an inside surface when the substrate layer 820 is bent. The first film 831 and the second film 832 may protect inside surfaces of the panel 710 and the bending portion 720.

In an embodiment, the encapsulation layer 840 may be disposed on at least part of the transistor layer 810. The encapsulation layer 840 may be disposed on one surface of the transistor layer 810 included in the panel 710. The encapsulation layer 840 may be disposed on an outside surface when the transistor layer 810 is bent. The encapsulation layer 840 may protect the transistor layer 810 from external foreign matter. The encapsulation layer 840 may be implemented with a thin film encapsulation (TFE).

In an embodiment, the resin layer 850 may be disposed on at least part of the transistor layer 810. The resin layer 850 may be disposed on one surface of the transistor layer 810 included in part of the bending portion 720 that is bent to have a specified curvature. The resin layer 850 may be disposed on the outside surface when the transistor layer 810 is bent. The resin layer 850 may protect the part of the bending portion 720 that is bent to have the specified curvature.

In an embodiment, the protective member 750 may be disposed on at least part of the transistor layer 810. The protective member 750 may be disposed on one surface of part of the bending portion 720 that is disposed to face the panel 710. The protective member 750 may be disposed on the outside surface when the transistor layer 810 is bent. The protective member 750 may be attached to the transistor layer 810. The protective member 750 may prevent the outside surface of the transistor layer 810 from making contact with a bracket (e.g., the bracket assembly 30 of FIG. 3).

Figure 8:
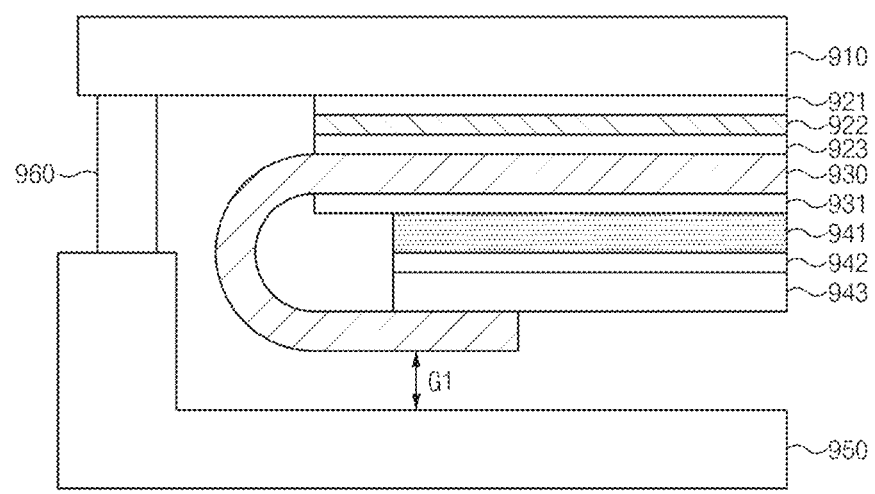
FIG. 8 is a sectional view of a conventional electronic device.

FIG. 8 is a sectional view of a conventional electronic device. Referring to FIG. 8, the conventional electronic device may include a window 910, a first adhesive layer 921, a polarization layer 922, a second adhesive layer 923, a panel 930 (e.g., the panel 710 and the bending portion 720 of FIG. 6), a third adhesive layer 931, a cushion layer 941, a fourth adhesive layer 942, a metal layer 943, a bracket 950 (e.g., the bracket assembly 30 of FIG. 3), and an adhesive member 960.

The window 910 may form a front plate. The window 910 may have rigidity. It is exemplified that the conventional electronic device of FIG. 8 is not a foldable electronic device. The window 910 may display a screen output from the panel 930 to the outside and may protect a front side.

The first adhesive layer 921 may attach the window 910 and the polarization layer 922 to each other. The polarization layer 922 may prevent reflection of external light incident on the panel 930, or may polarize light output from the panel 930. The second adhesive layer 923 may attach the polarization layer 922 and the panel 930 to each other.

The third adhesive layer 931 may attach the panel 930 and the cushion layer 941 to each other. The cushion layer 941 may be formed of a stretchable material and may protect the panel 930 from an external impact. The fourth adhesive layer 942 may attach the cushion layer 941 and the metal layer 943 to each other. The metal layer 943 may be a ground layer. For example, the metal layer 943 may be a copper sheet (a Cu sheet).

The bracket 950 may be disposed to be spaced apart from the bending portion 720 to have a first gap G1 with the bending portion 720 of the panel 930. One side of the bracket 950 may be attached to the window 910 by the adhesive member 960. Because the window 910 has rigidity, the first gap G1 between the bracket 950 and the bending portion 720 of the panel 930 may be maintained even though pressure is applied to the window 910.

When the conventional electronic device of FIG. 8 is a foldable electronic device, the window 910 may have flexibility. When the window 910 has flexibility, the first gap G1 between the bracket 950 and the bending portion 720 of the panel 930 cannot be maintained, and the bracket 950 and the panel 930 may make contact with each other. When the bracket 950 and the panel 930 make contact with each other, the bending portion 720 of the panel 930 may have a defect, such as a stabbed mark, due to a metal burr on the bracket 950 and a step and/or foreign matter on a surface of the bracket 950.

Furthermore, when the conventional electronic device of FIG. 8 is a foldable electronic device, the window 910 may be repeatedly folded and unfolded, and a movement of the periphery of the window 910 may occur depending on the repeated folding and unfolding motions. When the window 910 is fixed to the bracket 950 by the adhesive member 960, the window 910 may be lifted from the adhesive member 960, or may be damaged, due to a tolerance depending on the movement of the periphery of the window 910.

Figure 9:
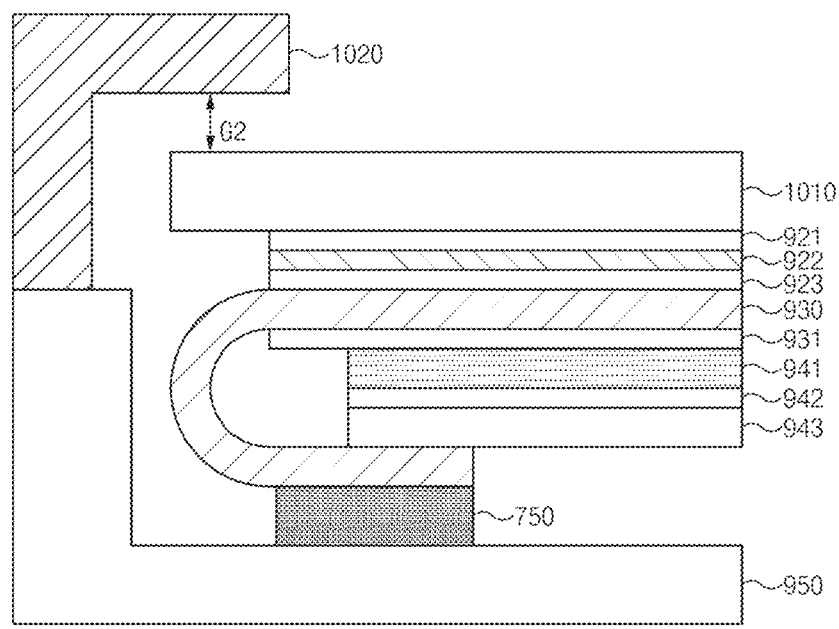
FIG. 9 is a sectional view of an electronic device according to the embodiment.

FIG. 9 is a sectional view of an electronic device according to the embodiment. The electronic device according to the embodiment may include a window 1010, a first adhesive layer 921, a polarization layer 922, a second adhesive layer 923, a panel 930 (e.g., the panel 710 and the bending portion 720 of FIG. 6), a third adhesive layer 931, a cushion layer 941, a fourth adhesive layer 942, a metal layer 943, a bracket 950 (e.g., the bracket assembly 30 of FIG. 3), a protective member 750, and a deco 1020. The first adhesive layer 921, the polarization layer 922, the second adhesive layer 923, the panel 930, the third adhesive layer 931, the cushion layer 941, the fourth adhesive layer 942, the metal layer 943, and the bracket 950 of FIG. 9 may be substantially the same as the first adhesive layer 921, the polarization layer 922, the second adhesive layer 923, the panel 930, the third adhesive layer 931, the cushion layer 941, the fourth adhesive layer 942, the metal layer 943, and the bracket 950 of FIG. 8. Therefore, repetitive description will hereinafter be omitted.

In an embodiment, the protective member 750 may be disposed between the panel 930 and the bracket 950. The protective member 750 may be attached to the panel 930 and the bracket 950. The protective member 750 may be formed on a flat portion of a bending portion (e.g., the bending portion 720 of FIG. 6) of the panel 930. For example, the protective member 750 may be disposed on a COP portion.

In an embodiment, the protective member 750 may have a height corresponding to a first gap (e.g., the first gap G1 of FIG. 8). The protective member 750 may be formed to fill the gap between the panel 930 and the bracket 950. The protective member 750 may cause the panel 930 and the bracket 950 to be fixed without being moved.

In an embodiment, it is exemplified that the electronic device of FIG. 9 is a foldable electronic device. To implement a foldable electronic device, the window 1010 may be flexible. For example, the window 1010 may be formed by printing a flexible material such as polyimide or polyethylene (PET). When pressure is applied to the window 1010, the window 1010 may apply pressure to components under the window 1010 while being deformed. The protective member 750 may prevent a movement of the panel 930 due to pressure delivered from the window 1010.

In an embodiment, the deco 1020 may be disposed on one side of the bracket 950. The deco 1020 may extend in the direction of the window 1010, and at least part of the deco 1020 may overlap the window 1010. The deco 1020 may be disposed at the periphery of the window 1010. The deco 1020 may not overlap the protective member 750.

In an embodiment, the deco 1020 may be disposed to have a second gap G2 with the window 1010. The window 1010 may be repeatedly folded and unfolded in a state of being spaced apart from the deco 1020. When the window 1010 and the deco 1020 are spaced apart from each other, a tolerance depending on a movement, or friction with the deco 1020 may be prevented even though a slip occurs in which the periphery of the window 1010 moves or slides. Accordingly, damage to the window 1010 may be prevented.

Figure 10:
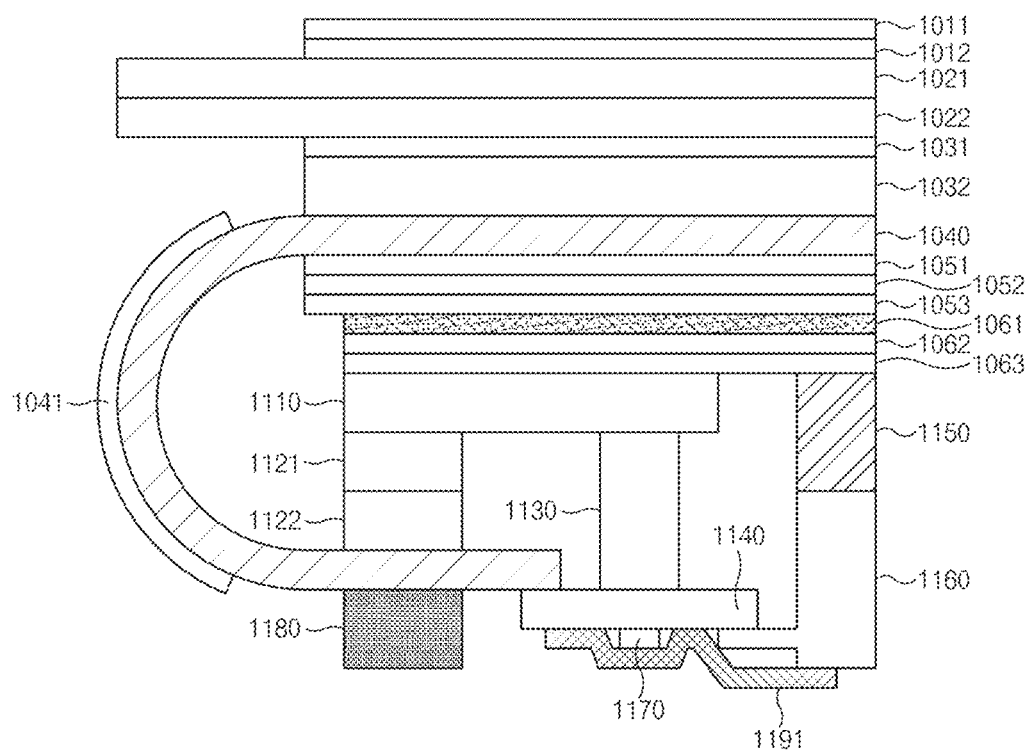
FIG. 10 is a sectional view of an electronic device according to another embodiment.

FIG. 10 is a sectional view of an electronic device according to another embodiment. The electronic device according to the other embodiment may include a first window 1011, a first pressure sensitive adhesive layer 1012, a second window 1021, a second pressure sensitive adhesive layer 1022, a polarization layer 1031 (e.g., the polarization layer 922 of FIG. 9), a third pressure sensitive adhesive layer 1032, a panel 1040 (e.g., the panel 930 of FIG. 9), a resin layer 1041 (e.g., the resin layer 850 of FIG. 7), a fourth pressure sensitive adhesive layer 1051, a first film 1052 (e.g., the first film 831 of FIG. 7), a fifth pressure sensitive adhesive layer 1053, a cushion layer 1061 (e.g., the cushion layer 941 of FIG. 9), a sixth pressure sensitive adhesive layer 1062, and a metal layer 1063 (e.g., the metal layer 943 of FIG. 9). In addition, the electronic device according to the other embodiment may include a step compensation tape 1110, a second film 1121 (e.g., the second film 832 of FIG. 7), a seventh pressure sensitive adhesive layer 1122, a cover spacer 1130, a film portion 1140 (e.g., the film portion 730 of FIG. 6), a conductive tape 1150, an FPCB 1160 (e.g., the FPCB 740 of FIG. 6), a display driver IC 1170 (e.g., the display driver IC 731 of FIG. 6), a protective member 1180 (e.g., the protective member 750 of FIG. 7), and a first antistatic member 1191.

In an embodiment, the first window 1011 may be disposed over the second window 1021. The second window 1021 may be more likely to suffer damage such as scratches on a surface thereof, compared to a conventional window formed of glass. The first window 1011 may be additionally attached to protect the second window 1021. The first window 1011 may be a window formed of a material and a structure that can be replaced when damaged. For example, the first window 1011 may be formed of polyethylene having ductility. The first pressure sensitive adhesive layer 1012 may attach the first window 1011 and the second window 1021 to each other.

In an embodiment, the second window 1021 may be a flexible window. For example, the first window 1011 may be formed of flexible polyimide. The second pressure sensitive adhesive layer 1022 may attach the second window 1021 and the polarization layer 1031 to each other.

In an embodiment, the polarization layer 1031 may prevent reflection of external light incident on the panel 1040, or may polarize light output from the panel 1040. The third pressure sensitive adhesive layer 1032 may attach the polarization layer 1031 and the panel 1040 to each other.

In an embodiment, the panel 1040 may output a screen toward the first window 1011. The resin layer 1041 may protect an outer portion of the panel 1040 that is bent to have a specified curvature. The fourth pressure sensitive adhesive layer 1051 may attach the panel 1040 and the first film 1052 to each other.

In an embodiment, the first film 1052 may protect a bent inside surface when the panel 1040 is bent. The fifth pressure sensitive adhesive layer 1053 may attach the first film 1052 and the cushion layer 1061 to each other.

In an embodiment, the cushion layer 1061 may protect the panel 1040 from an external impact. The sixth pressure sensitive adhesive layer 1062 may attach the cushion layer 1061 and the metal layer 1063 to each other. The metal layer 1063 may be a ground layer.

In an embodiment, the step compensation tape 1110 may be disposed in an area where the second film 1121, the seventh pressure sensitive adhesive layer 1122, and the cover spacer 1130 are disposed. The step compensation tape 1110 may compensate for a step caused by the second film 1121, the seventh pressure sensitive adhesive layer 1122, and the cover spacer 1130 having a height less than the height of the conductive tape 1150 and the FPCB 1160.

In an embodiment, the second film 1121 may protect the bent inside surface when the panel 1040 is bent. The seventh pressure sensitive adhesive layer 1122 may attach the second film 1121 and the panel 1040 to each other. The cover spacer 1130 may compensate for a step between the step compensation tape 1110 and the film portion 1140. The film portion 1140 may include the display driver IC 1170 mounted thereon. The conductive tape 1150 may connect the FPCB 1160 and the metal layer 1063 to each other. The FPCB 1160 may be electrically connected with the display driver IC 1170 through a connection with the film portion 1140. The FPCB 1160 may connect a processor (e.g., the processor 1220 of FIG. 12) and the display driver IC 1170 to each other.

In an embodiment, the protective member 1180 may be disposed on a bending portion (e.g., the bending portion 720 of FIG. 6) of the panel 1040. The protective member 1180 may be disposed on an area of the bending portion other than the area where the film portion 1140 is disposed. The protective member 1180 may cover at least part of the area of the bending portion 720 other than the area where the film portion 1140 is disposed. The protective member 1180 may have a greater thickness than the film portion 1140.

In an embodiment, the first antistatic member 1191 may cover the FPCB 1160, the film portion 1140, and the display driver IC 1170. The first antistatic member 1191 may protect the FPCB 1160, the film portion 1140, and the display driver IC 1170 from a shock caused by static electricity.

Figure 11A:
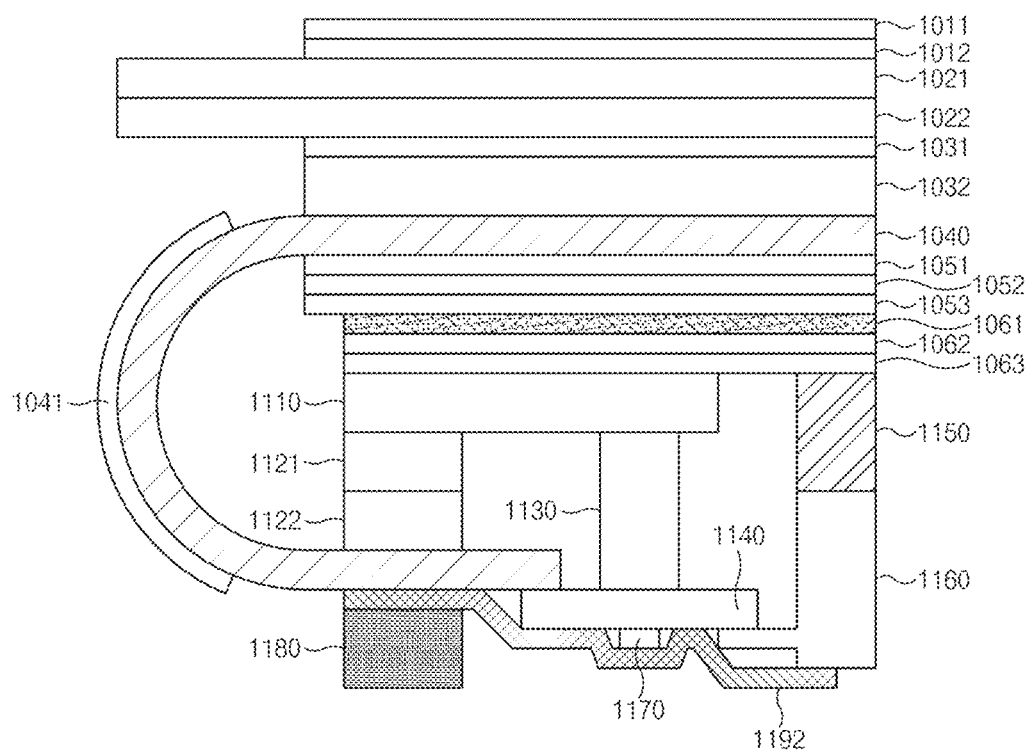
FIG. 11A is a sectional view of an electronic device according to another embodiment.
Figure 11B:
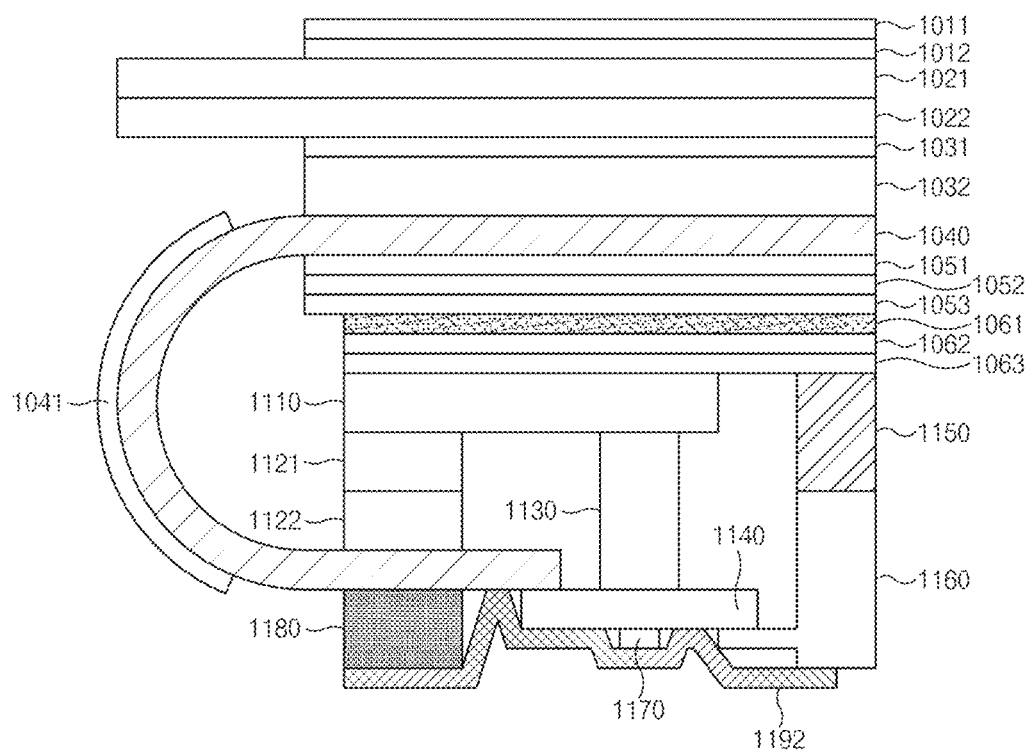
FIG. 11B is a sectional view of an electronic device according to another embodiment.

FIGS. 11A and 11B are sectional views of electronic devices according to other embodiments. The electronic devices according to the other embodiments are substantially the same as the electronic device described with reference to FIG. 10, except that the electronic devices according to the other embodiments have a second antistatic member 1192. Therefore, repetitive description will hereinafter be omitted.

In an embodiment, the second antistatic member 1192 may cover an FPCB 1160, a film portion 1140, a display driver IC 1170, and at least part of a bending portion (e.g., the bending portion 720 of FIG. 6) of a panel 1040. For example, as illustrated in FIG. 11A, the second antistatic member 1192 may be disposed between the panel 1040 and a protective member 1180. The second antistatic member 1192 may extend to the bending portion 720 and may cover at least part of the bending portion 720. For example, as illustrated in FIG. 11B, the second antistatic member 1192 may extend to the bending portion 720 on which the protective member 1180 is formed. In this case, the protective member 1180 may be disposed between the panel 1040 and the second antistatic member 1192. The second antistatic member 1192 may protect the bending portion 720 of the panel 1040, on which the protective member 1180 is disposed, from a shock caused by static electricity.

In an embodiment, the protective member 1180 may be disposed on one surface of the second antistatic member 1192. The protective member 1180 may cover at least part of an area of the bending portion 720 covered by the second antistatic member 1192 other than the area where the film portion 1140 is disposed.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a bracket assembly including a first bracket, a second bracket and a hinge for allowing the first bracket and the second bracket to rotate with respect to each other;
a flexible display including a window, the flexible display disposed on the first bracket and the second bracket and being configured to be folded when the first bracket and the second bracket rotate with respect to each other, the flexible display comprising a first portion visually exposed through the window, a second portion parallel to the first portion and disposed between at least part of the first portion and the first bracket and a bending portion spaced from a side of the first bracket and including the second portion;
a film, comprising an adhesive, including a first surface contacting the first bracket and a second surface contacting the second portion and configured to reduce movement of the flexible display due to deformation of the window when the flexible display is folded; and
a deco coupled to the side of the first bracket and including a portion parallel to and spaced from the window.

2. The electronic device of claim 1, wherein the deco is spaced from the window.

3. The electronic device of claim 1, wherein the window includes a flexible material comprising polyimide.

4. The electronic device of claim 1, wherein the window includes a flexible material comprising polyethylene (PET).

5. The electronic device of claim 1, wherein the film comprises a pressure-sensitive adhesive.

6. The electronic device of claim 1, further comprising:
a display driver integrated circuit electrically connected to pixels of the flexible display; and
an anti-static film disposed between at least the display driver integrated circuit and the first bracket.

7. The electronic device of claim 6, wherein the anti-static film includes a portion disposed between at least the film and the second portion.

8. The electronic device of claim 6, wherein the anti-static film includes a portion disposed between at least the film and the first bracket.

9. The electronic device of claim 6, wherein the film is disposed closer to the side of the first bracket than the display driver integrated circuit.

10. The electronic device of claim 1, comprising a foldable smartphone.

11. The electronic device of claim 1, wherein the second portion is attached to the first bracket at a location closer to the side of the first bracket than a display driver integrated circuit.

12. The electronic device of claim 1, wherein the window includes a flexible material comprising a ductile material.

13. The electronic device of claim 1, wherein the window includes a flexible material comprising a deformable material.

14. The electronic device of claim 1, wherein the window includes a flexible material comprising a printable material.

15. The electronic device of claim 1, wherein the window includes a flexible material comprising a replaceable structure.

\* \* \* \* \*